C. H. TRULLINGER.
COMBINATION EYE CUP AND CONTAINER.
APPLICATION FILED JUNE 27, 1917.
1,336,109.
Patented Apr. 6, 1920.
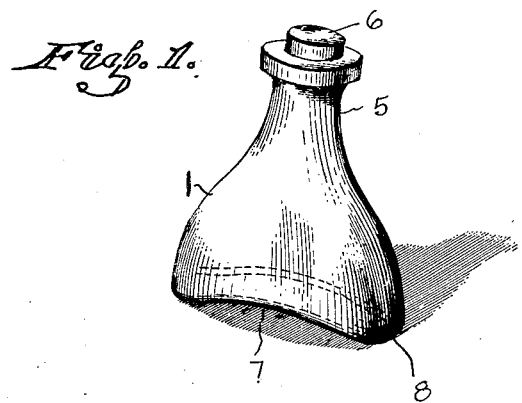
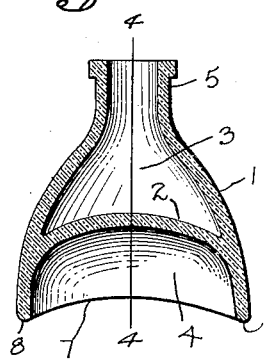
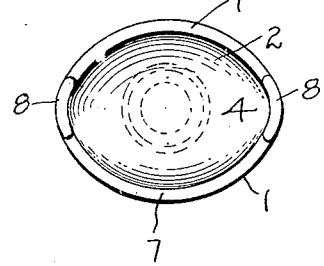
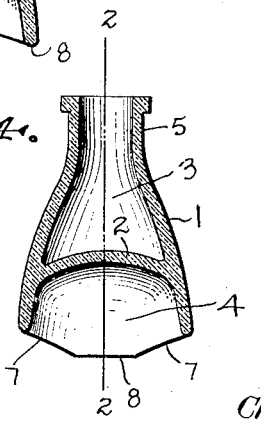
WITNESS:
Lincoln Johnson
INVENTOR.
Charles H. Trullinger
BY
Baldwin Vale
ATTORNEYS.

UNITED STATES PATENT OFFICE.

CHARLES H. TRULLINGER, OF SAN FRANCISCO, CALIFORNIA.

COMBINATION EYE-CUP AND CONTAINER.

1,336,109.  Specification of Letters Patent.  Patented Apr. 6, 1920.

Application filed June 27, 1917. Serial No. 177,297.

*To all whom it may concern:*

Be it known that I, CHARLES H. TRULLINGER, a citizen of the United States, and a resident of the city and county of San Francisco, State of California, have made a new and useful invention, to-wit: Combination Eye-Cup and Container; and I do hereby declare the following to be a full, clear, concise, and exact description of the same.

This invention is a new article of manufacture.

The invention is an improved vessel which may be in the form of a combination eye-cup and container for an eyewash.

In this specification and the annexed drawings I disclose my invention in the form which I consider the best, but I do not limit my invention to such form as it may be embodied in other forms, and it is to be understood that in and by the claim following the description herein I intend to cover my invention in whatever form it may be embodied.

Referring to the drawings:—

Figure 1 is a perspective view of my invention.

Fig. 2 is a vertical section of the invention taken on line 2—2 of Fig. 4.

Fig. 3 is a bottom plan of the invention.

Fig. 4 is a transverse vertical section of the invention taken on line 4—4 of Fig. 2.

In the drawings 1 indicates the outer wall of the vessel which is continuous in cross section and converges toward one end and diverges toward its other end. A wall 2 extends transversely of the vessel and divides the vessel into two receptacles 3 and 4. The outer end of the receptacle 3 is shaped to form a neck 5 to receive a stopper 6 for closing the receptacle. Said receptacle may be used as a container for containing an eyewash. The outer wall of the receptacle 4 may be elliptical in cross section and the outer edges of the side walls of the greater radius may be concaved as indicated in 7 so that the outer walls of the receptacle may fit around and over a person's eye and the receptacle used as an eyecup for holding a liquid for treatment of a person's eye. The end walls of the smaller radius of the receptacle 4 may have flat edges 8 to rest upon a flat surface to support the vessel in an upright position with the receptacle 3 above the receptacle 4.

The eyewash may be kept in the container in tablet form.

Having thus described my invention I claim as new and desire to secure by Letters Patent:

A new article of manufacture, a receptacle substantially elliptical in cross section having the walls thereof converging toward one end and converging toward the other end thereof; a partition interiorly of the receptacle and integral therewith dividing same into two receptacles; means for closing the diverging end of said receptacle; and means whereby the end edge of the open receptacle is concaved on the two greater sides thereof and flattened on the two lesser sides to rest upon a surface and support the containing receptacle uppermost.

In testimony whereof I have hereunto set my hand at San Francisco, California, this 20th day of June, 1917.

CHARLES H. TRULLINGER.

In presence of—
BALDWIN VALE,
A. J. HENRY.